MOTION CONTROL DEVICE

Filed June 17, 1968 2 Sheets-Sheet 1

INVENTORS
GENE A. FISHER
HOWARD E. VAN WINKLE
BY
ATTORNEY

United States Patent Office 3,490,672

Patented Jan. 20, 1970

3,490,672

MOTION CONTROL DEVICE

Gene A. Fisher and Howard E. Van Winkle, Boulder, Colo., assignors to International Business Machines Corporation, Armonk, N.Y., a corporation of New York

Filed June 17, 1968, Ser. No. 737,662
Int. Cl. B65h *17/20*
U.S. Cl. 226—188 7 Claims

ABSTRACT OF THE DISCLOSURE

A motion control device including an electric motor having an integral armature and driving capstan assembly. The capstan is mounted directly on the armature adjacent one end and the assembly is rotatably mounted on a stationary mandrel positioned at the rotational axis of the device.

SUMMARY OF THE INVENTION

The present invention relates to improvements in motion control devices, and more particularly to devices capable of providing intermittent or continuous motion at high speeds and with improved start/stop characteristics.

In present day technology, there are ever increasing applications for motion control devices capable of producing motion at high velocities and extremely high acceleration/deceleration rates. One such application is in the magnetic data storage area wherein a record media such as a tape, strip, or the like is required to be moved past a transducer at high speed to accomplish storage or readout of information magnetically stored on the media. It is also required that the media be moved in a stop/start mode so that blocks of data can be accessed or stored as required by a utilization device. Since conventional data storage devices of the movable magnetic media type store or recover information only when the media is travelling at constant speed, the response of the storage system is a function of the ability of the system to accelerate and decelerate the medium from rest to the operating speed, and to maintain the operating speed within close tolerances. It is, therefore, necessary that the motion control device which drives the media have maximum response characteristics and excellent speed control at the motion transfer interface between the control device and the driven media.

In the past, substantial effort has been directed toward provision of motors having improved acceleration/deceleration times and high torque-to-inertia ratios. These efforts have been directed toward improving the motor itself, however, and have not solved the entire problem. Irrespective of the performance of the motor, the desired drive characteristics cannot be realized unless they are exhibited at the drive interface between the motion control device and the to-be-controlled element. In prior art devices, it has apparently always been assumed that the response degradation caused by the connections from the motor to the drive member that imparts motion to the driven element is something that cannot be cured. Prior art devices uniformly provide shafting between the motor armature and the drive element for transmitting the driving force developed at the armature. This shafting, of course, is subject to torsional flexibility and produces effects such as torsional delay and torsional resonance which, in turn, cause unwanted oscillations and speed fluctuations at the drive interface.

It is the primary object of this invention to provide a novel motion control device, including both a motor and a drive element in which the problems identified with conventional shaft couplings are substantially avoided.

More specifically, it is an object of this invention to provide an integrated motor-drive element construction in which no intermediate shafting is utilized.

It is also an object of this invention to provide an integrated motor-drive capstan assembly which is economical and easy to manufacture and assemble and which exhibits, at the capstan, a minimum acceleration/deceleration time, smooth handling of the driven media at high speed, and a high torque-to-inertia ratio.

The invention achieves the foregoing objects with a unique construction which includes a lightweight, low inertia, non-ferrous armature, supported for rotation between magnetic field producing means and a stationary flux return member, and which includes a drive capstan mounted directly to the armature itself. The construction of a preferred embodiment also includes a support structure which provides for positive support of both the armature and capstan at both ends to avoid any cantilevered elements and the consequent problems of alignment and play.

The foregoing and other objects, features, and advantages of the invention will be apparent from the following more particular description of preferred embodiments of the invention, as illustrated in the accompanying drawings.

DETAILED DESCRIPTION

Figures 1, 2:
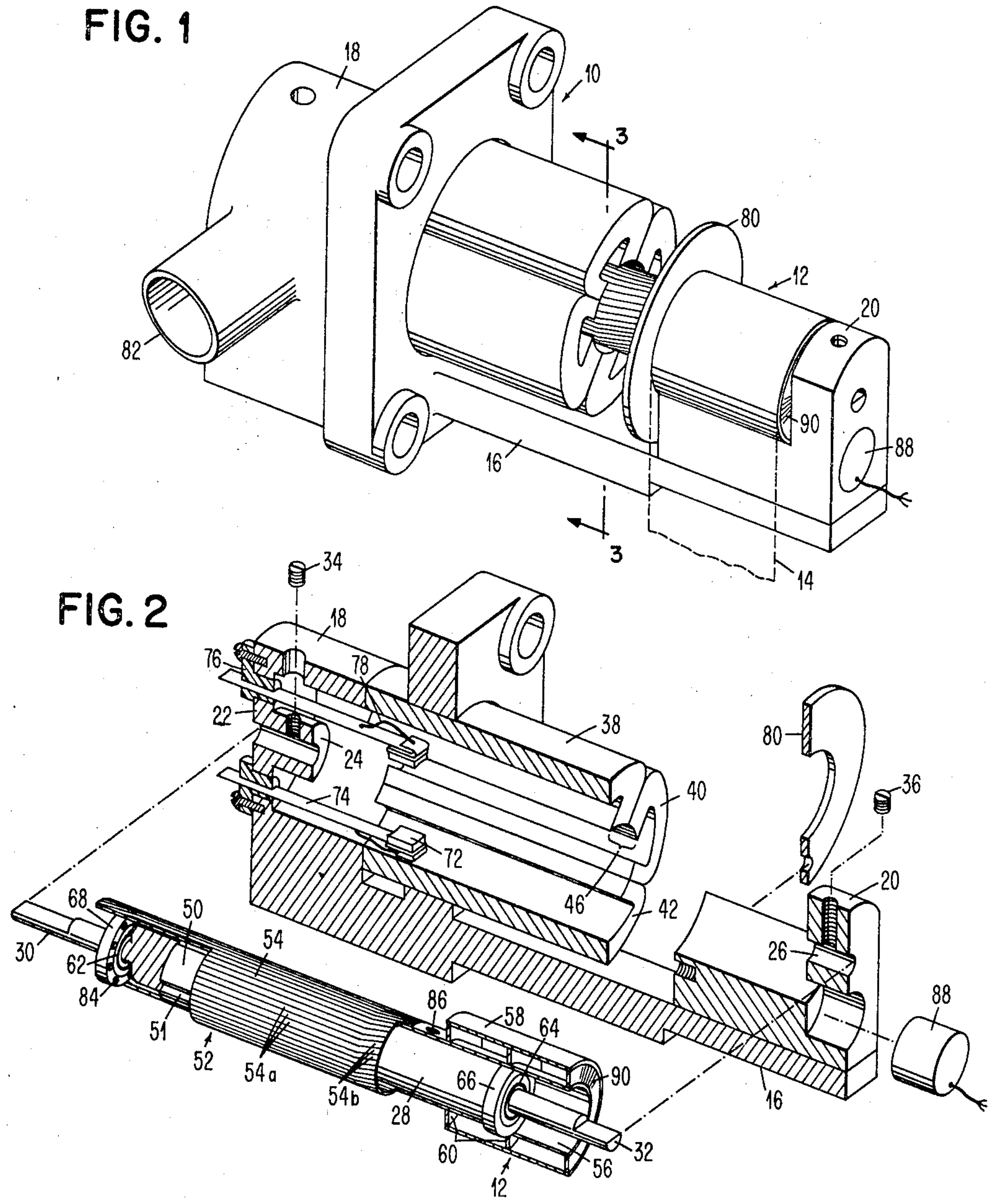
FIGURE 1 is a perspective illustration of an integrated motor-capstan assembly embodying the present invention.
FIGURE 2 is an exploded vertical, longitudinal sectional view of the device shown in FIGURE 1 which better illustrates the unique construction thereof.
Figure 3:
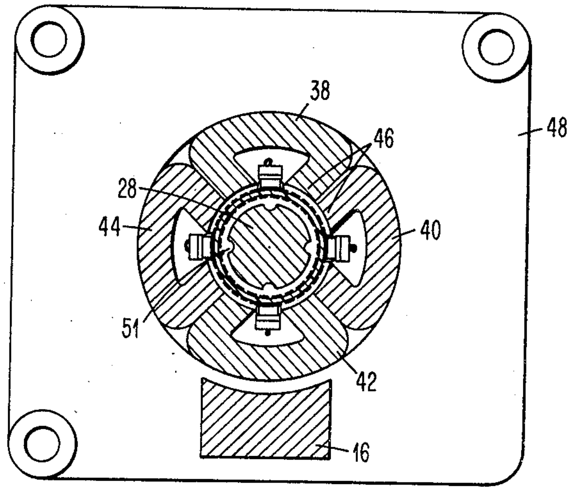
FIGURE 3 is a vertical, transverse sectional view taken substantially along the lines 3—3 of FIGURE 1.

Referring now in detail to the drawings, FIGURES 1–3 show a motion control device including a motor 10 and capstan 12 arranged to drive a magnetic record media 14 in the form of an elongated web or strip partially wrapped around the capstan 12 and frictionally engaged thereby. As will be seen from the drawings, the motor 10 and capstan 12 are parts of an integral assembly supported in a common frame member. The frame member includes a longitudinal base plate 16 having generally upstanding supports 18 and 20 at its opposite ends. Support 18 is in the form of a hollow cylindrical housing having a longitudinal central axis extending parallel to and above the base 16. The housing 18 has an upright end wall 22 which carries a shaft receiving collar 24 at the axis of the cylindrical housing. The support 20 at the other end of base plate 16 has a shaft receiving aperture 26 therein axially aligned with collar 24. A generally cylindrical mandrel 28 is supported between the members 18 and 20. As shown best in FIGURE 2, this mandrel 28 includes shaft portions 30 and 32 which are respectively received in the collar 24 and aperture 26 to mount the mandrel. Set screws 34 and 36 rigidly secure the shaft portions 30 and 32 in place.

The mandrel 28 serves to mount the rotating portions of the motion control device and also acts as a flux return path for the stator flux of the motor 10. The motor in this embodiment is a four pole permanent magnet D.C. motor. It includes four elongated, permanent magnets 38, 40, 42, and 44, supported on the frame-work of the device near the end housing 18. The magnets are C-shaped in cross-section. Referring to FIGURE 3, it will be seen that these magnets are arranged to encircle the mandrel 28 with their poles extending inwardly. Adjacent magnets have like poles butted together so that a pair of poles of adjacent magnets combine to form one stator pole 46. The magnets 38–44 are held in place by an upright collar 48, formed on base plate 16, which encircles them. As shown in FIGURE 2, the magnets 38–44 abut the open end of the cylindrical housing 18 and effectively form an extension thereof. A suitable epoxy cement is employed to bond the magnets to each other, to the collar 48, and to the end of the housing 18 to form a rigid structure.

The inwardly directed pole faces of the four stator poles 46 are finished to an arcuate shape and form parts of an imaginary cylindrical surface concentric with the axis of the mandrel 28. Aligned with these faces is an enlarged cylindrical flux return portion 50 on mandrel 28. The portion 50 is of a diameter sufficiently smaller than that of the cylindrical surface containing the faces of stator poles 46, to provide annular clearance for the motor armature described later herein. Grooves 51 in the surface of flux return member 50 assist in focussing the flux from stator pole 46 in the annular gap within which the armature rotates.

The armature of the motor 10 is an extremely lightweight, low inertia element. It is formed of an elongated tube 52 of insulating material, such as an epoxy-filled fiber glass, having sufficient rigidity to retain its cylindrical shape. A copper armature winding 54 of a conventional pattern, such as a lap winding, is obtained on the tube 52 near one end by printed circuit techniques. As best shown in FIGURE 2, the armature winding 54 is arranged to have parallel segments **54*a* extending generally axially of the tube for a distance about equal to the length of the magnets 38–44. These segments are provided on both the inner and outer surfaces of the tube and they are connected by end segments 54*b* which extend angularly at the ends to obtain the proper lap winding connections. The winding portions on the inner and outer surfaces are conductively connected by holes drilled through the tube 52 at the ends of the segments 54*b*** and filled with the conductive material of which the windings are formed.

While any of the several known techniques may be employed to obtain the windings 54, a satisfactory printed circuit technique is generally set forth below for purposes of illustration. In accordance with this technique, the tube 52 is first drilled at the points where the inner and outer winding portions are to be connected. A copper coating is then obtained on both the inner and outer surfaces of the tube by conventional plating techniques, which may include electroless plating to obtain a cathode, followed by electroplating to the desired thickness. This plating fills the holes in the tube so that conductive connections are present between the inner and outer coatings at the necessary end points for the ultimate winding pattern. The coated tube is then covered with a suitable resist, both inside and out, and the winding pattern is impressed on the resist. If photographic techniques are employed, the resist will be of a photosensitive type and the pattern is impressed by exposing the resist through masks wrapped around the inner and outer surfaces. The resist is then developed and washed to obtain the final pattern. As an alternative, the pattern may be mechanically applied by scribing through the resist to expose the copper along the lines which will become divisions between adjacent winding portions.

After the resist has been selectively removed, the winding pattern is impressed on the copper coatings by etching the exposed areas. The etching process is continued until all exposed copper is removed. The resist which protected the winding portions during the etching process is then washed away and the final winding pattern is exposed.

An alternative method of constructing the armature involving the development of winding patterns on planar sheets and wrapping the sheets to form a cylinder may also be employed. An example of an armature constructed in this maner is shown in the IBM Technical Disclosure Bulletin, vol. 6, No. 6, November 1963, at pp. 50 and 51.

Referring again to FIGURE 2, it will be observed that the armature tube 52 includes a portion 56, extending beyond the windings 54. This portion of the tube is employed as the driving element of the motion control device and has the capstan 12 counted directly upon it. The capstan 12 is of lightweight construction to limit the inertia of the device and comprises a cylindrical member 58 of the desired diameter carried on the tube portion 56 by a plurality of ring-shaped supports 60. A suitable surface coating, such as rubber, is applied to the outer surface of the member 58 to provide the necessary frictional engagement with the media 14.

Figure 4:
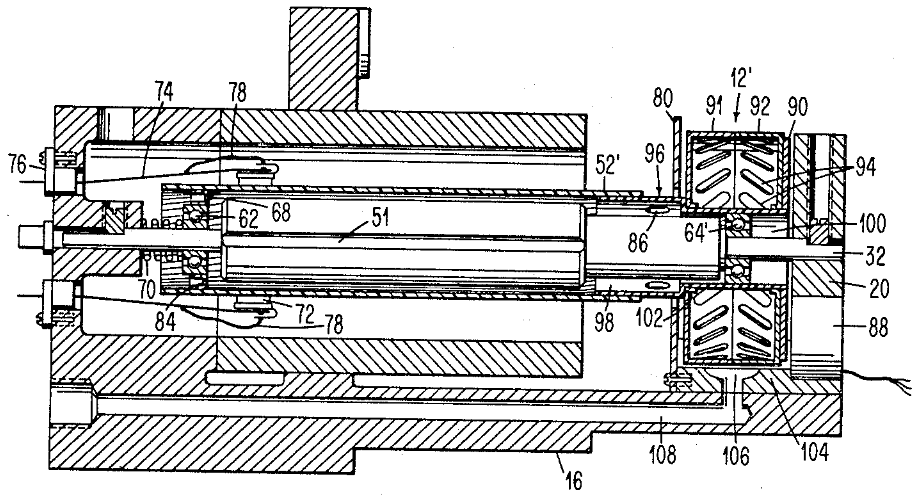
FIGURE 4 is a vertical, longitudinal sectional view of a modified embodiment of the invention.

The tube 52, with its windings 54 and capstan 12, is rotatably mounted on the mandrel 28 by bearings 62 and 64. As indicated in FIGURE 2, bearing 62 is mounted on the shaft portion 30 near one end of the flux return portion 50, while bearing 64 is mounted on shaft portion 32 at the other end of member 50. The inner race of bearing 64 is fixed on shaft portion 32 and the outer race is cemented to an annular spacer 66 fixed to the inner surface of the tube portion 56, about midway between the ends of the capstan 12. The outer race of bearing 62 is likewise cemented to a spacer 68 fixed to the armature tube 52. Spacer 68 rests against the inner windings on the armature, but it is formed of an insulating material and does not affect them. The construction and arrangement of the bearings and spacers is best shown in FIGURE 4. Although FIGURE 4 represents a modified capstan arrangement, it employs the same mounting arrangement for the armature as the FIGURE 1 embodiment. The inner race of bearing 62 is slidable on shaft portion 30 and is urged inwardly toward flux return member 50 by a spring 70. The purpose of spring 70 is to load the bearings 62 and 64 laterally to eliminate any play that may exist.

Armature current for the motor 10 is supplied via conventional brushes 72, which are carried by inwardly extending brush supports 74 mounted in the end wall 22 of housing 18. The supports 74 are carried in insulating mountings 76, secured to the end wall 22. The brushes 72 engage the winding portions **54*a* on the outer surface of the tube 52 and commutate directly on these windings. The brushes are urged into firm contact with the armature by the supports 74, which are in the form of resilient leaf springs. The brushes are pivotally mounted on the supports so that they will ride smoothly in full surface contact in spite of normal surface wear. Sufficient electrical contact through the pivot joint is obtained by a wire connection 78 from each brush 72 to its support 74**.

It has been found that commutation directly from the armature windings **54*a* does not adversely affect the windings during the normal life of the unit. The windings in the commutation zone may be made thicker by plating additional copper on them, if desired, to ensure against wear. In addition, the supports 74** may be arranged to have different lengths so that some brushes ride on a different part of the windings than others.

To assure that the magnetic record media 14 driven by capstan 12 is not adversely affected by stray fields from motor 10, a magnetic shield 80 is provided between the motor and capstan. The shield is formed of high permeability material and is mounted on front support 20 in a manner to block flux transmission between the motor and the capstan area.

It is common practice in the motor art to provide a flow of cooling air to the motor to maintain a reasonably low operating temperature. With the construction just described, efficient cooling may be achieved by introducing air into the housing 18 so that it can flow along the armature and stator and escape at the end adjacent the shield 80. An inlet 82 is provided in the housing 18 for this purpose and a suitable air supply may be connected thereto. To provide for a free flow of air within the armature, apertures 84 are provided in the bearing spacer 68, and additional apertures 86 are provided in the tube portion 56. These apertures permit a free flow of air inside the armature to cool it and the mandrel 28.

It will be apparent from the foregoing that the motion control device just described provides an effective means for driving an element such as a magnetic tape in a stop/start mode at high speeds and with high acceleration/deceleration rates. The unique arrangement of elements, including the direct placement of the capstan on the armature tube, couples the capstan and motor without the necessity for any intermediate shafting, etc., and, thus, largely avoids the performance degradation associated therewith. The response at the capstan-record tape interface is effectively that observed at the armature, since the armature and capstan are integral parts. Of course, there is some torsional effect even from one end of the armature to the other, even in the stiffest of elements, but with this construction it is greatly reduced over conventional systems. Very little torsional delay or resonance is encountered. What is left is that associated with the armature tube itself.

If desired, a tachometer may be provided for the motion control device in a simple and effective manner. A reflective tachometer is diagrammatically shown in the drawings as position A in the end support 20 of the device. The tachometer includes a housing 88 which carries light emitting and receiving elements, supported in support 20, together with a tachometer disk 90 having alternate reflecting and non-reflecting radial lines thereon, mounted on the adjacent face of the capstan 12. Since the details of the tachometer form no part of the invention, it is not shown or described in detail.

In the embodiment of FIGURES 1–3, the capstan 12 is shown as mounted on the extension 56 of armature tube 52. It will be appreciated, of course, that the surface of the portion 56 may, itself, be used as the driving member if a capstan diameter equal to the tube diameter is appropriate for the motion control application at hand. As another alternative, the capstan may be fixed to the end of the tube, as shown in FIGURE 4 of the drawings.

Referring to FIGURE 4, it will be noted that the general construction of the motion control device shown is the same as that of the device of FIGURE 1. Accordingly, the same reference characters have been used to identify similar elements in the two embodiments. The FIGURE 4 embodiment employs a somewhat different arrangement for mounting the capstan 12′ to the armature tube 52′. This particular arrangement is useful in the case where it is desired to provide vacuum to assure driving engagement between the capstan 12′ and the record media. As shown, the vacuum capstan 12′ comprises a hollow toroidal member made up of two mating half sections 91 and 92 of lightweight construction. Each of the members 91 and 92 has slots 94 formed in its circumference surface to permit a flow of air therethrough. A rubber or other suitable frictional coating is applied over the circumference of the capstan; the coating does not cover nor close the slots 94.

The capstan 12′ is secured to an adapter sleeve 96 which mounts in the open end of the armature tube 52′. The sleeve 96 is formed of an insulating material; for example, the same epoxy fiber glass material as the tube 52′. It has an enlarged tubular portion 98 which slips into the open end of the tube 52 and is rigidly cemented thereto. A smaller tubular section 100 mounts the capstan 12′. The capstan 12′ is securely cemented to the smaller section 100 and to the shoulder portion 102 between the sections 98 and 100. A bearing 64′ is provided between the portion 100 of the sleeve 96 and the shaft member 32 of the mandrel 28. The bearing 64′, together with bearing 62 at the other end of armature 52′, supports the armature and capstan for rotation on mandrel 28.

It will be observed that, with this construction, capstan 12′ is arranged to have a hollow interior which communicates with the exterior circumferential surface through the ports or slots 96. As mentioned, the purpose of the construction is to provide for vacuum engagement between the capstan and the record media driven thereby. The required vacuum is made available by providing, on the base plate 16 beneath the capstan 12′, a shroud block 104 which has an arcuate upper face in close juxtaposition to the capstan for effectively sealing the ports 96 in the lower half of the capstan driving surface. The shroud block 104 has a vacuum port 106 therein, which connects via a duct 108 in base plate 16 to a vacuum source (not shown). Vacuum pressure in port 106 withdraws air from the interior of capstan 12′ through the slots 96 as they pass the port and produces a low pressure condition within the capstan. This low pressure condition acts through the slots 96 to draw the record media wrapped around the capstan into frictional engagement therewith to enhance the driving capability of the device. Although not shown in FIGURE 4, the record media is wrapped sufficiently around the capstan to cover substantially all of the ports 96 not covered by the shroud block 104, so that a sufficient vacuum condition may be maintained without a large air flow through the port 106 and duct 108.

It will be appreciated that the construction of FIGURE 4 provides the same benefits and advantages as the construction of FIGURE 1. While a separate adapter sleeve has been shown for mounting the capstan to the armature tube for simplicity in manufacture, it will be appreciated that the tube 52′ and sleeve 98 may be of one piece construction. Depending upon the required diameters of the armature and the capstan, and the required volume for the evacuated interior of the capstan, it may or may not be necessary for the sleeve to have a reduced diameter portion, such as shown at 100.

Although the motion control device provided in accordance with this invention has been described as employing a D.C. motor using permanent magnets, it will be understood that other motor arrangements known in the art may be employed as well. For example, a D.C. motor using electromagnets may be employed, or any of a number of alternating current motor arrangements may be used.

While the invention has been particularly shown and described with reference to preferred embodiments thereof, it will be understood by those skilled in the art that various changes in form and details may be made therein without departing from the spirit and scope of the invention.

What is claimed is:

1. An improved motion control device comprising:

(a) a motor, including stationary stator means and an armature rotatably mounted with respect to said stator means;

(b) means for supplying electrical energy to said motor to produce rotating torque for the armature; and (c) a cylindrical driving element having a driving interface on its circumferential surface fixed directly to said armature adjacent one end thereof for transmitting driving force through said driving interface to separate driven means.

2. The invention defined in claim 1 wherein said driving element comprises a cylindrical capstan fixed directly to said armature.

3. The invention defined in claim 1 wherein the cylindrical driving element is a cylindrical surface portion of the armature.

4. The invention defined in claim 2 wherein said armature is a hollow cylindrical tube of insulating material having conductive winding means thereon and said capstan is a hollow cylindrical member fixed to said tube adjacent one end.

5. The invention defined in claim 4 wherein said motion control device includes stationary mandrel means extending along the rotational axis of the motor and said armature and capstan are rotatably mounted on said stationary mandrel means.

6. An improved motion control device comprising:

(a) a supporting frame including a pair of spaced-apart upright support members;

(b) a stationary mandrel means supported between said support members;

(c) an armature and driving capstan assembly including a hollow cylindrical element having armature winding means and a driving element fixed thereon, said hollow cylindrical element being supported on the mandrel means for rotational movement;

(d) motor stator means supported on said framework in magnetic coupling relationship with said armature winding means for supplying a magnetic field to said armature; and (e) means for supplying electrical energy to said motion control device to produce rotational torque for said armature and capstan assembly.

7. The invention defined in claim 6 wherein the armature and stator means are in the form of a direct current motor, the stator means consisting of a plurality of permanent magnet poles, and the armature winding means consisting of direct current armature windings having commutator portions exposed around the circumference of said hollow cylindrical element, and wherein the means for supplying electrical energy includes armature brush means mounted on the framework and conductively engaging the commutator portions of the armature winding means.

References Cited

UNITED STATES PATENTS

| | | | |
|---|---|---|---|
| 2,766,633 | 10/1956 | Wall | 266—188 |
| 2,866,143 | 12/1958 | Maxwell | 266—188 |
| 3,225,233 | 12/1965 | Kirilouckas | 310—46 |
| 3,312,846 | 4/1967 | Henry-Baudot | 310—266 |
| 3,356,877 | 12/1967 | Burr | 310—266 |
| 3,419,202 | 12/1968 | Maxey | 226—188 |
| 3,428,233 | 2/1969 | Hokkinen | 226—188 |
| 3,445,699 | 5/1969 | Beaudry | 310—266 |

MILTON O. HIRSHFIELD, Primary Examiner

R. SKUDY, Assistant Examiner

U.S. Cl. X.R.

226—95; 310—75, 266